US007366374B1

(12) United States Patent
Lee et al.

(10) Patent No.: US 7,366,374 B1
(45) Date of Patent: Apr. 29, 2008

(54) MULTILAYER OPTIC DEVICE AND AN IMAGING SYSTEM AND METHOD USING SAME

(75) Inventors: Susanne Madeline Lee, Cohoes, NY (US); Forrest Frank Hopkins, Cohoes, NY (US); Peter Michael Edic, Albany, NY (US); Joseph John Manak, Albany, NY (US); William Eugene Powell, III, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/751,844

(22) Filed: May 22, 2007

(51) Int. Cl.
*G02B 6/42* (2006.01)

(52) U.S. Cl. ............................ 385/31; 378/41; 378/46; 378/87; 378/90; 378/98.6; 378/101; 378/113; 378/146

(58) Field of Classification Search .................. 385/14, 385/31, 115–119, 129, 131–134, 146
See application file for complete search history.

(56) References Cited

U.S. PATENT DOCUMENTS

| | | | | |
|---|---|---|---|---|
| 5,192,869 | A | 3/1993 | Kumakhov | |
| 5,604,353 | A | 2/1997 | Gibson et al. | |
| 5,744,813 | A * | 4/1998 | Kumakhov | 250/505.1 |
| 6,504,901 | B1 * | 1/2003 | Loxley et al. | 378/84 |
| 6,504,902 | B2 * | 1/2003 | Iwasaki et al. | 378/84 |
| 6,934,359 | B2 | 8/2005 | Chen et al. | |
| 7,006,741 | B1 * | 2/2006 | Yu | 385/121 |
| 2006/0093086 | A1 * | 5/2006 | Gallagher | 378/45 |

OTHER PUBLICATIONS

Tournear et al., "Gamma-Ray Channeling in Layered Structures", IEEE, pp. 4282-4285, 2004.

* cited by examiner

*Primary Examiner*—Frank G. Font
*Assistant Examiner*—Hung Lam
(74) *Attorney, Agent, or Firm*—William E. Powell, III; Curtis B. Brueske

(57) ABSTRACT

An optic device, system and method for imaging are described. The optic device includes a first solid phase layer having a first index of refraction with a first photon transmission property and a second solid phase layer having a second index of refraction with a second photon transmission property, the solid phase layers being situated between an output face and a non-flat input face. The first and second layers are conformal to each other. The imaging system includes a source of electrons and a target, with an array of the optic devices coupled thereto to form limited cone beams of X-ray radiation.

28 Claims, 11 Drawing Sheets

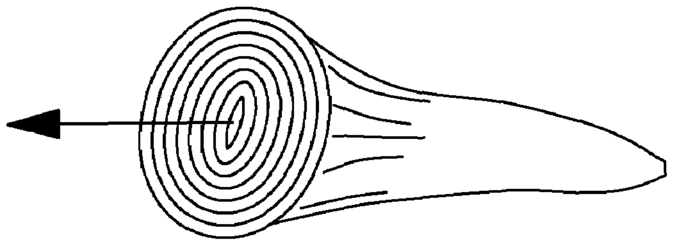
FIG.9
FIG.10
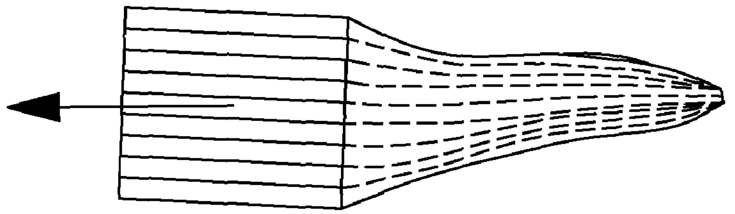
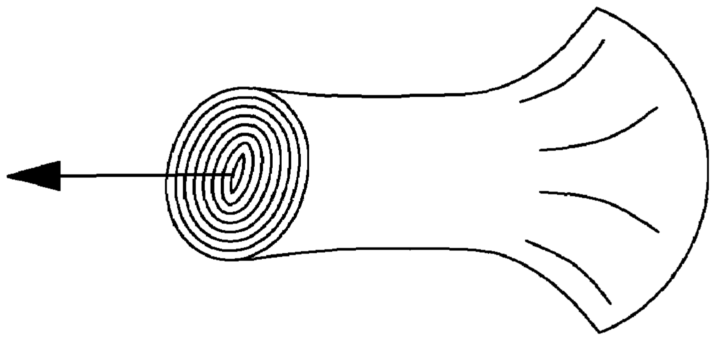
FIG.11
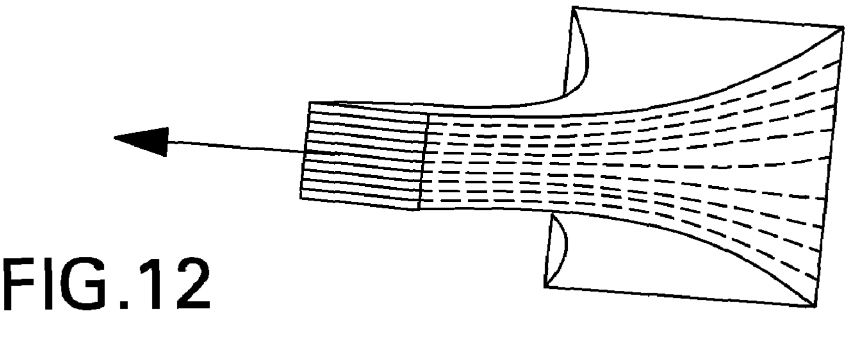
FIG.12

MULTILAYER OPTIC DEVICE AND AN IMAGING SYSTEM AND METHOD USING SAME

BACKGROUND

The invention relates generally to optics, and more particularly to optic devices used in systems and methods for imaging.

Numerous applications exist that require a focused beam of electromagnetic radiation. For example, energy dispersive X-ray diffraction (EDXRD) may be used to inspect airline baggage for the detection of explosive threats or other contraband. Such EDXRD may suffer a high false positive rate due to weak diffracted X-ray signals. The weakness of the X-ray signals may stem from a variety of origins. First, a portion of the polychromatic X-ray spectrum used in EDXRD is produced by the Bremsstrahlung part of the source spectrum, which is inherently low in intensity. Second, X-ray source collimation may eliminate more than 99.99 percent of the source X-rays incident on the baggage volume under analysis. Third, some of the materials being searched for, e.g., explosives, may not diffract strongly as they are amorphous. Fourth, the diffracting volume may be small. The last two limitations arise from the type of threat materials being searched for in baggage, making all but the second limitation unavoidable. Although discussed in the context of explosives detection, the limitations described above are equally applicable to medical situations.

At lower X-ray energies, such as 60 keV and below, increasing the polychromatic X-ray flux density at the material being inspected has been addressed, for example, by coupling hollow glass polycapillary optics to low powered, sealed tube (stationary anode) X-ray sources. An example of hollow glass polycapillary optics may be found in, for example, U.S. Pat. No. 5,192,869. The glass is the low index of refraction material, and air filling the hollow portions is the high index of refraction material. These types of optics typically do not provide much gain at energy levels above 60 keV, since the difference in the indices of refraction between air and glass, and hence the critical angle for total internal reflection, becomes increasingly small as energy levels approach and surpass 60 keV.

Further, such optics use a concept of total internal reflection to reflect X-rays entering the hollow glass capillaries at appropriate angles back into the hollow capillaries, thereby channeling a solid angle of the source X-rays into collimated or focused beams at the output of the optic. As used herein, the term "collimate" refers to the creation of quasi-parallel beams of electromagnetic (EM) radiation from divergent EM beams. Only about five percent of an EM source's solid angle typically is captured by the input of such known optics.

In addition, the use of air in known optics as one of the materials prevents such optics from being placed within a vacuum. Thus, known optics are limited in their potential uses.

It would thus be desirable for a device that could collect more of the primary electromagnetic radiation from the source and redirect those rays to a desired spot to improve the electromagnetic radiation flux density at that spot.

BRIEF DESCRIPTION

The invention includes embodiments that relate to an imaging system for imaging an object. The imaging system includes a source of electrons, a target, enclosed within a housing, for emitting X-rays upon being struck by electrons from the source of electrons, a window positioned within a wall of the housing, and an optic device positioned external to the housing and within a pathway of at least a portion of the X-rays. The optic device utilizes total internal reflection to redirect the X-rays at an energy level above about sixty keV.

The invention includes embodiments that relate to an imaging system for imaging an object. The imaging system includes a source of electrons, a target for emitting X-rays upon being struck by electrons from the source of electrons, a vacuum chamber for housing the target, a window between the vacuum chamber and the object, and an optic device positioned within the vacuum chamber and utilizing total internal reflection to redirect the X-rays.

The invention includes embodiments that relate to an imaging system for imaging an object. The imaging system includes at least one source of electrons, at least one target for emitting X-rays upon being struck by electrons from the at least one source of electrons, and an array of optic devices utilizing total internal reflection to redirect the X-rays. The array of optic devices are positioned between the at least one target and the object. Further, either or both of the at least one source of electrons and the at least one target include, respectively, a plurality of sources of electrons and a plurality of targets.

The invention includes embodiments that relate to a method for imaging an object. The method includes placing an object between a source of X-rays and a detector, emitting electrons toward an anode to initiate formation of X-rays, and redirecting the X-rays through an optic device at an energy level above about sixty keV.

The invention includes embodiments that relate to an optic device for transmitting and redirecting X-rays by means of total internal reflection. The optic device includes a non-flat input face, an output face, and at least three conformal solid phase layers between the non-flat input face and the output face. The interfaces between the solid phase layers are gapless and the at least three conformal solid phase layers include at least two X-ray redirection regions.

These and other advantages and features will be more readily understood from the following detailed description of preferred embodiments of the invention that is provided in connection with the accompanying drawings.

BRIEF DESCRIPTION OF THE DRAWINGS

FIG. 9 is a perspective view of an optic device constructed in accordance with an embodiment of the invention.

FIG. 10 is a perspective view of an optic device constructed in accordance with an embodiment of the invention.

FIG. 11 is a perspective view of an optic device constructed in accordance with an embodiment of the invention.

FIG. 12 is a perspective view of an optic device constructed in accordance with an embodiment of the invention.

DETAILED DESCRIPTION

Figure 1:
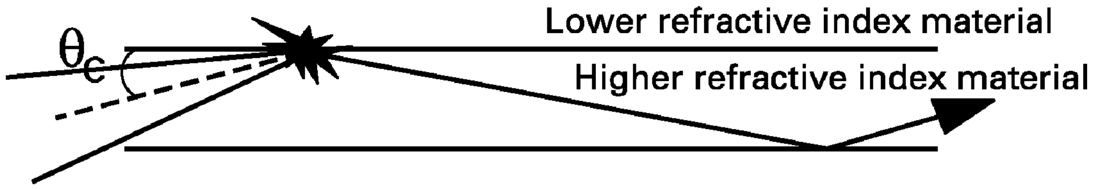
FIG. 1 is a schematic view illustrating the phenomenon of total internal reflection.
Figure 2:
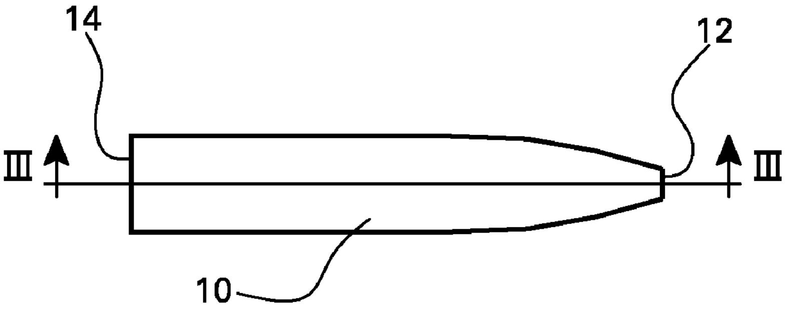
FIG. 2 is a top schematic view of an optic device constructed in accordance with an embodiment of the invention.
Figure 3:
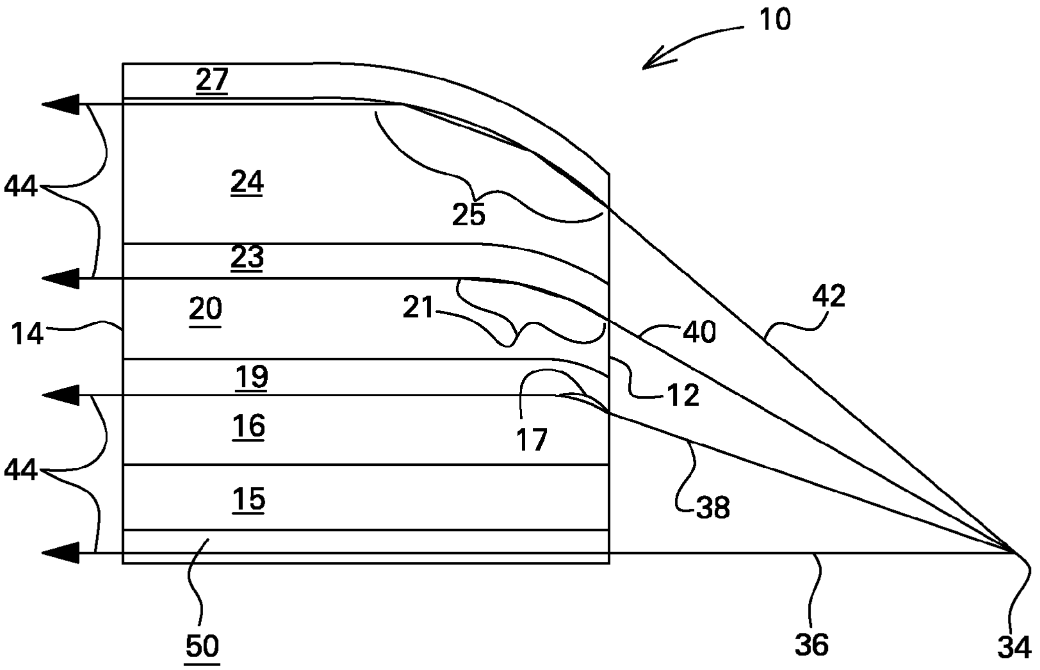
FIG. 3 is a cross-sectional view of the optic device of FIG. 2 taken along line III-III.
Figure 4:
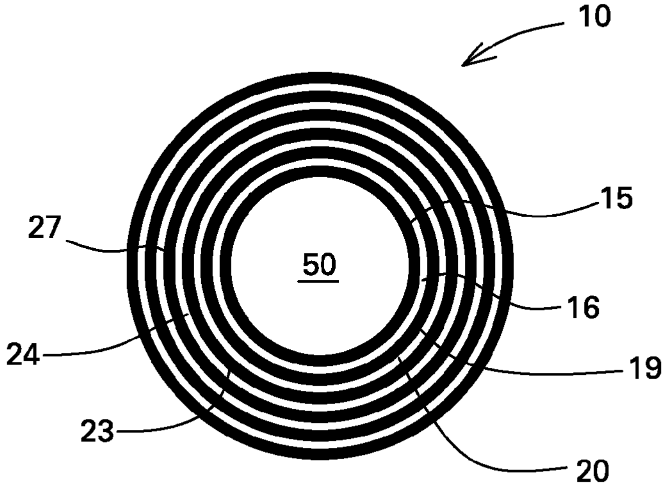
FIG. 4 is an end view of the optic device of FIG. 2.

Embodiments of the invention described herein utilize the phenomenon of total internal reflection. Referring to FIG. 1, when an angle of incidence is less than a critical angle $\theta_c$, total internal reflection occurs. The critical angle $\theta_c$ for total internal reflection depends on, among other factors, the selection of materials, the difference in the relative indices of refraction between the materials, the material photon absorption properties, and the energy of the incident photons. By appropriate material selection in the multilayer optic described herein, the critical angle $\theta_c$ can be increased several times over an air-glass critical angle, allowing many more photons to satisfy the condition for total internal reflection. This will allow a greater photon transmission through multilayer optic than is possible with, for example, polycapillary optics.

Referring now to FIGS. 2-5, there is shown a multilayer optic 10 including an input face 12 and an output face 14. By "multilayer" is meant a structure that has a plurality of layers with each layer having a single composition. As shown more particularly in FIGS. 3 and 4, the multilayer optic 10 includes multiple layers of material, each having a different index of refraction. For example, there are layers 16, 20, and 24 surrounding a core 50. Layer 15, formed of a lower index of refraction material, is positioned radially exterior to and contiguous with the core 50. The core 50 may be formed of a higher index of refraction material such as beryllium, lithium hydride, magnesium, or any other suitable elements or compounds having similarly higher refractive indices and high X-ray transmission properties. The core 50 may be less than a micrometer to greater than one centimeter in diameter. Layer 20 is positioned radially exterior to layer 16 and radially interior to layer 24.

In one embodiment, the layers making up the multilayer optic 10 may be formed of materials that have varying indices of refraction. For example, layers 15, 19, 23, and 27 may be formed of materials that have a lower index of refraction and a high X-ray absorption. For example, for high energy X-rays, appropriate materials may be chosen from osmium, platinum, gold, or any other suitable elements or compounds having similarly lower refractive indices and high X-ray absorption properties. Further, the core 50 and layers 16, 20, and 24 may be formed of materials having a higher index of refraction and a high X-ray transmission. For example, for high energy X-rays, appropriate materials may be chosen from beryllium, lithium hydride, magnesium, or any other suitable elements or compounds having similarly higher refractive indices and high X-ray transmission properties. The diameter of the core 50 is selected by considering the critical angle for total internal reflection between the higher index of refraction of the core 50 and the lower index of refraction of the layer 15 and the distance between the optic input face and a focal point of a source.

By using alternating lower and higher index of refraction materials with concurrent high and low X-ray absorption properties, respectively, in contiguous layers, the multilayer optic 10 can utilize the principle of total internal reflection of electromagnetic radiation. Specifically, diverging electromagnetic radiation beams 38, 40, and 42 stemming from an electromagnetic radiation source 34 enter the input face 12 and are redirected by the principle of total internal reflection into quasi-parallel beams of photons 44 exiting the output face 14.

Multilayer optics in accordance with embodiments of the invention, such as optic 10, can collect a large solid angle of an X-ray source 34 and redirect photons containing polychromatic energies into quasi-parallel photon beams. "Quasi-parallel" means that diverging beams of photons, such as X-rays, have been collected and focused into beams of electromagnetic radiation or X rays to exit the output face 14 at or below the critical angle $\theta_c$. This divergence causes the intrinsic source X-ray beam to be larger than the output face 14 of the optic 10 and larger than the quasi-parallel beam of X rays produced by the optic. Alternatively, multilayer optics in accordance with embodiments of the invention may be configured to produce slightly focused, highly focused, slightly diverging, or highly diverging beams. By "slightly focused" is meant that the beam size at the point of interest (i.e., where the diameter of the beam is of concern) is approximately the same as at the output face 14 of the optic 10. By "highly focused" is meant that the beam size at the point of interest is smaller than at the output face 14 of the optic 10. By "slightly diverging" is meant that the beam size is larger than a quasi-parallel beam but smaller than the intrinsic source beam. By "highly diverging" is meant that the beam is the same size or larger than the intrinsic source beam. The phrase "intrinsic source beam" is meant to represent an X-ray beam emitted from the source housing with no optic in the beam.

The composition of materials making up the multilayer optic 10, the macroscopic geometry of the multilayer optic 10, the thickness of the multilayer optic 10, and the number of individual layers determine the angular acceptance range of the multilayer optic 10. The angular acceptance range may be from about 0 steradians up to about $2\pi$ steradians of a solid angle of a photon source. For ease of illustration, only a few layers have been illustrated with reference to multilayer optic 10. However, it should be appreciated that any number of layers, including into the hundreds, thousands, or millions of layers, can be fabricated to utilize total internal reflection to form the various types of photon beams listed previously.

Another feature of the multilayer optic 10 is that the core 50 and the layers 16, 20, 24 have photon, or X-ray, redirection regions. For example, layer 16 has a photon redirection region 17 stemming from a center of curvature; layer 20 has a photon redirection region 21 stemming from a second center of curvature; and, layer 24 has a photon redirection region 25 stemming from yet another center of curvature. The photon redirection regions 17, 21, 25 are chosen to allow for the diverging electromagnetic radiation beams 38, 40, and 42 to be made parallel or near parallel to beam 36, or conversely to allow for parallel or converging electromagnetic radiation beams to be made diverging. The minimum photon redirection region is determined by the minimum thickness that would still enable a smooth surface, which is at least two atomic layers, or about ten angstroms. The photon redirection regions 17, 21, 25 each contain redirecting segments. The redirecting segments are chosen such that they each have a constant curvature. The curvature of each redirecting segment may be the same as or different from the curvatures of other redirecting segments. If each of the redirecting segments for a particular photon redirection region is straight, then the radius of curvature is infinite.

By curving the multilayers 16, 20, 24 at the input side of the optic 10, the photons or electromagnetic radiation 38, 40, 42 entering the input face 12 can be redirected into parallel pencil beams 44, thereby increasing the photon flux density at the output face 14 over the photon flux density in the direct source beam at the same distance from the source 34. Depending upon the number of layers in the multilayer optic, there may be a photon density gain for 100 keV photons of as much as 5000 times in the output intensity of electromagnetic radiation from the multilayer optic over the output of conventional pinhole collimators. It should be appreciated that, alternatively, the output face 14 may be formed closer to the input face 12, i.e., positioned prior to the region where the photons are redirected into parallel rays, allowing the input electromagnetic radiation beams 38, 40, 42 to remain somewhat diverging as they exit the output face 14. It should further be appreciated that core 50 and any number of the layers may have no arc of curvature, instead having a cylindrical cross-sectional profile.

An important feature of this optic 10 is that the layers can be made thin enough and the overall optic length (from input face 12 to output face 14) short enough that photons are redirected through bounces along only one side of a particular layer, for example, layer 24. This is unlike known optics, where the photons bounce off both sides of a particular layer. The fewer number of bounces needed to redirect the photons in this multilayer optic 10 significantly increase the photon transmission efficiency of the optic 10.

Another feature of the multilayer optic 10 is that through fabrication techniques that will be described in detail below, the individual layers can be formed conformally on one another. The conformation of the layers enables the multilayer optic 10 to be utilized in a vacuum environment. Prior art optics utilize air as the higher refractive index material. Such optics cannot be used in vacuum environments. Further, the multilayer optic 10 can be utilized in applications that operate at energy levels above 60 keV, such as, for example, X-ray diffraction, CT medical and industrial imaging, medical and industrial X-ray, and cargo inspection, to name a few. Some of these applications may operate at energy levels as high as 450 keV.

Figure 6:
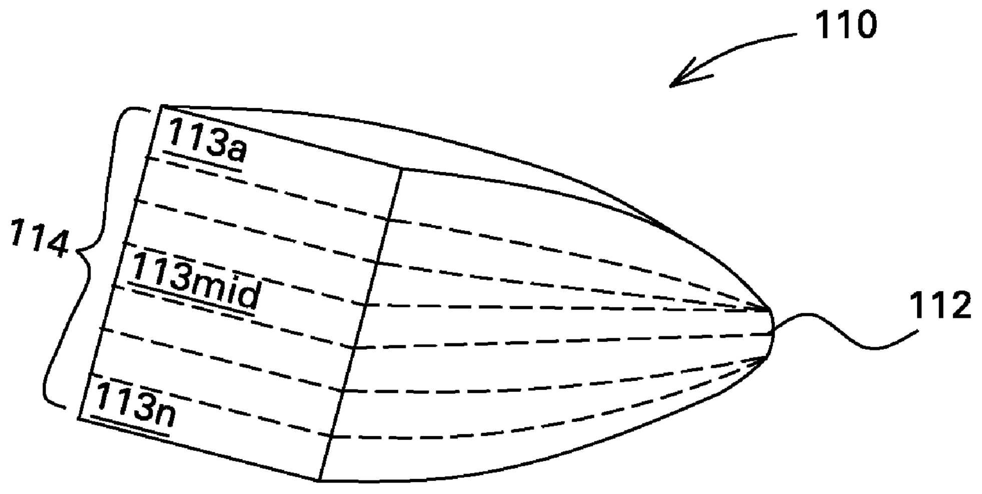
FIG. 6 is a perspective view of an optic device constructed in accordance with an embodiment of the invention.

Referring now to FIG. 6, there is shown a multilayer optic 110 including a plurality of layers 113*a*-113*n*, one on top of the other, extending between an input face 112 and an output face 114 having a polygonal profile. As illustrated, the middle layer of the multilayer optic 110 is layer 113*mid*. Except for layer 113*mid*, all of the layers include a photon redirection region positioned between the input face 112 and the output face 114. It should be appreciated, however, that layer 113*mid* may include a photon redirection region, or that other layers in addition to 113*mid* may lack a photon redirection region. The design shown allows diverging electromagnetic radiation to be input into the input face 112, redirected by the optic multilayers, and output from the output face 114 into a reduced cone beam, such as, for example, a reduced cone fan beam. Depending upon where the output face 114 is located relative to the photon redirection regions, the fan beams may be parallel or near parallel or may be somewhat divergent but still focused relative to the input of electromagnetic radiation. Additionally, the conformal nature of the individual layers allows for the multilayer optic 110 to be utilized in a vacuum environment.

Figure 7:
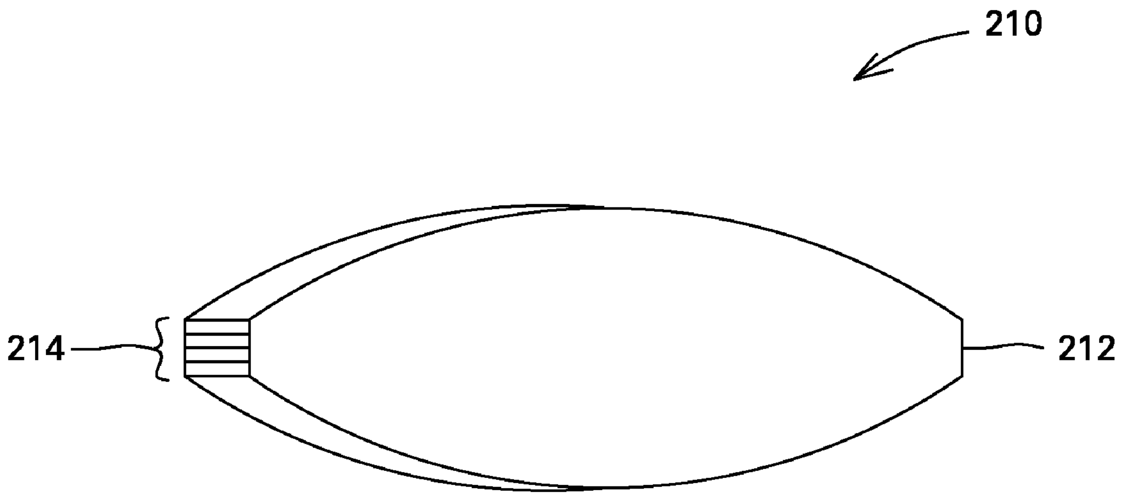
FIG. 7 is a perspective view of an optic device constructed in accordance with an embodiment of the invention.

Referring to FIG. 7, there is shown a multilayer optic 210 that includes an input face 212 and an output face 214. As with the embodiment shown in FIG. 6, the multilayer optic 210 includes individual layers sandwiching a mid-layer. The design shown allows for a focused fan beam output. As with the previously described embodiments, the conformal nature of the individual layers allows the multilayer optic 210 to be used in a vacuum environment.

Figure 8:
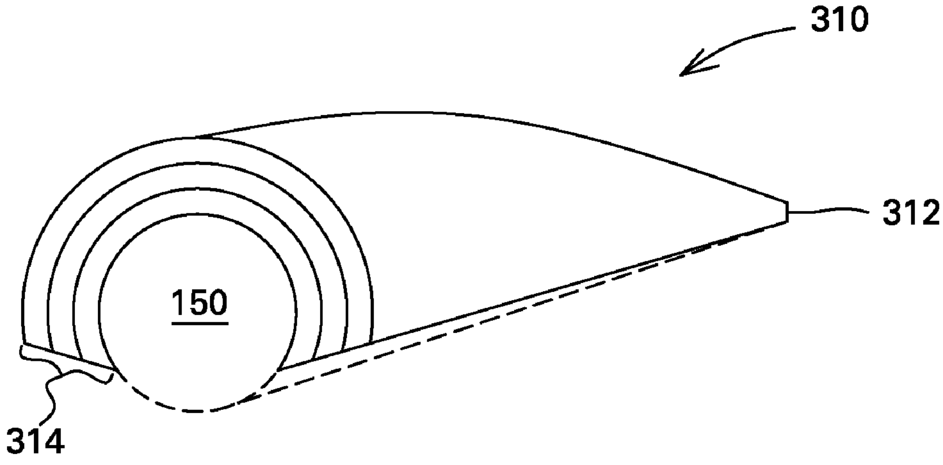
FIG. 8 is a perspective view of an optic device constructed in accordance with an embodiment of the invention.

FIG. 8 illustrates a multilayer optic 310 having an input face 312 and an output face 314. The layers have been positioned over a cone 150, which serves as a blank or mold for the individual layers. Through this design, the output beam exiting the output face 314 is shaped into a curved output, which can be coupled to a singly curved diffracting crystal (not shown) to enable the creation of a cone beam of highly monochromatic radiation. Monochromatic radiation is used in several different applications, including, for example, X-ray diffraction. Highly monochromatic radiation is radiation within a very narrow energy range approximately equal to that produced by diffracting from a single crystal. The singly curved diffracting crystal can be formed of any suitable material, such as, for example, mica, silicon, germanium, or platinum and curved so that the crystal conforms to the surface of, for example, a cone or cylinder. The suitability of any material for use as the diffracting crystal is dependent upon the diffraction intensity and the lattice spacing of the material. It should be appreciated that the multilayer optic 310 should be positioned between the source of the electromagnetic radiation and the diffracting crystal.

Figure 5:
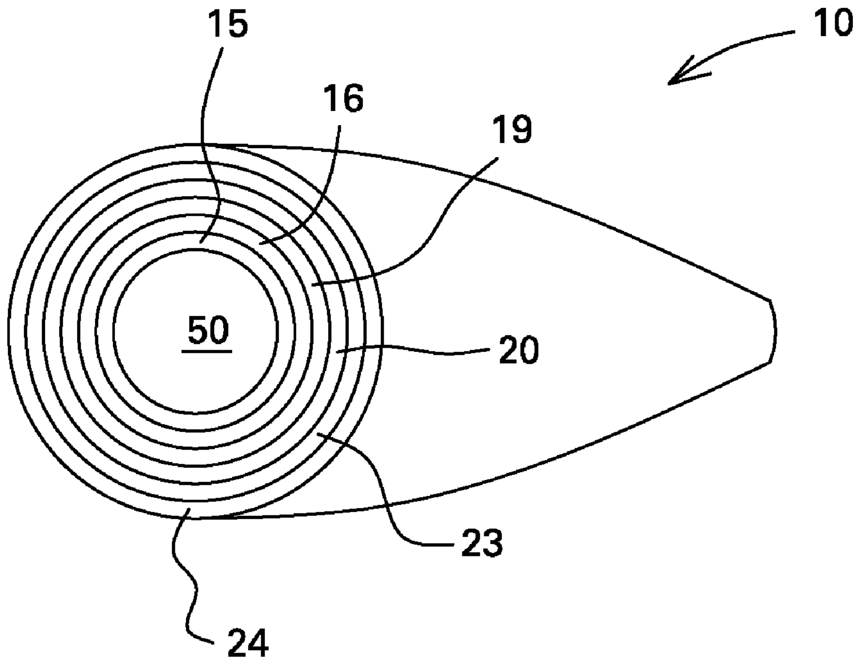
FIG. 5 is a perspective view of an optic device like the optic device of FIG. 2.

Placing a filter at the input or the output faces of the optics in FIGS. 5-7 will make the output radiation from these optics quasi-monochromatic. Quasi-monochromatic radiation is radiation within a limited wavelength range that is greater than the highly monochromatic range but less than the full Bremsstrahlung spectrum from an X-ray source.

FIGS. 9-12 illustrate various other potential embodiments of multilayer optics. FIGS. 9 and 10 illustrate multilayer optics that have output faces in a photon redirection region, thereby allowing such optics to emit highly diverging beams. FIGS. 11 and 12 illustrate multilayer optics whose output faces are dimensionally smaller than their respective input faces, allowing such optics to emit highly focused beams.

Figure 13:
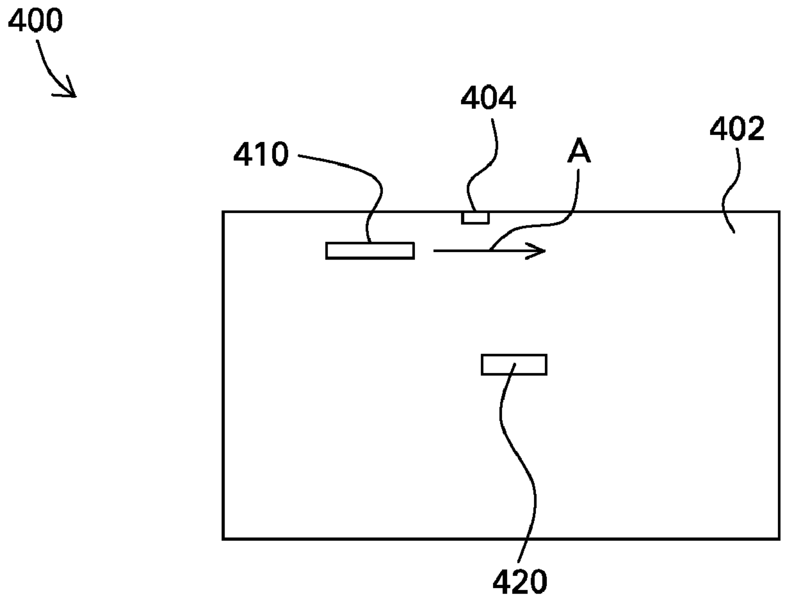
FIG. 13 is a schematic view of a deposition assembly constructed in accordance with an embodiment of the invention.

Referring now to FIG. 13, next will be described an apparatus for use in forming a multilayer optic. Specifically, a multilayer optic deposition assembly 400 is shown including a deposition chamber 402 and a movable shutter apparatus 410. The deposition chamber 402 may be utilized in suitable deposition techniques, including, for example, vapor deposition, or thermal spray deposition. Suitable vapor deposition techniques include sputtering, ion implantation, ion plating, laser deposition, evaporation, and jet vapor deposition. Evaporation techniques may include thermal, electron-beam, or any other suitable technique resulting in appreciable deposition of material. Suitable thermal spray deposition includes combustion, electric arc, and plasma spray. The deposition chamber 402 includes an inputting apparatus 404 for allowing ingress of deposition materials into the deposition chamber 402. It should be appreciated that the inputting apparatus 404 may include numerous inlet nozzles, each being associated with a specific deposition material. A blank 420 is positioned within the deposition chamber 402. The blank 420 may be a core 50 or a cone 150, described previously with regard to the embodiments illustrated in FIGS. 4 and 8, or it may be a substrate serving as a support mechanism for deposited layers. It should be appreciated that the blank 420 can assume virtually any suitable geometric configuration consistent with the desired beam profile. Examples of the almost infinite number of suitable geometric configurations include a circular wafer, a rectangular prism, a cone, a cylinder, and an egg-shape, to name a few.

The shutter apparatus 410 enables the formation of a multilayer optic wherein the individual layers have a photon redirection region. Specifically, as a deposition material is input into the deposition chamber 402 through the inputting apparatus 404, the shutter apparatus 410 moves in a direction A relative to the blank 420. If the speed of the shutter apparatus 410 decreases as it moves in the direction A, an increasing amount of deposition material will contact the blank 420 in the direction A, thereby enabling the formation of a multilayer optic with individual layers having different thicknesses and having photon redirection regions. Control of the movement and velocity of the shutter apparatus 410 may be accomplished electronically with a digital controlling mechanism, such as a microcontroller, microprocessor, or computer. Alternatively, control of the movement may be accomplished manually, or mechanically, such as, pneumatically, hydraulically, or otherwise.

By moving the shutter apparatus 410 along direction A as each deposition material is input through the inputting apparatus 404 into the deposition chamber 402, the individual layers can be deposited upon the blank 420, and a multilayer optic having conformal individual layers, like the multilayer optic 110 shown in FIG. 6, can be formed. In forming a multilayer optic like the multilayer optic 110, the first layer to be laid down may be the mid-layer 113*mid*. Then, the subsequent layers leading to and including layer 113*a* can be deposited. Then, the partially formed multilayer optic can be turned over and the layers leading to and including layer 113*n* can be deposited. Further, assuming a constant rate of deposition material being injected into the deposition chamber 402, if the shutter apparatus 410 is programmed to begin with a first velocity, transition into a second different velocity, and then transition back to the first velocity, a multilayer optic like the multilayer optic 210 shown in FIG. 7 can be formed. It should be appreciated that the deposition rate of the deposition material in the deposition chamber 402 may be altered as well.

Instead of utilizing a shuttle apparatus 410, it is possible to move at varying speeds the inputting apparatus 404 relative to the blank 420. Further, it is possible to move at varying speeds the blank 420 within the deposition chamber 402 relative to the inputting apparatus 404.

Figure 14:
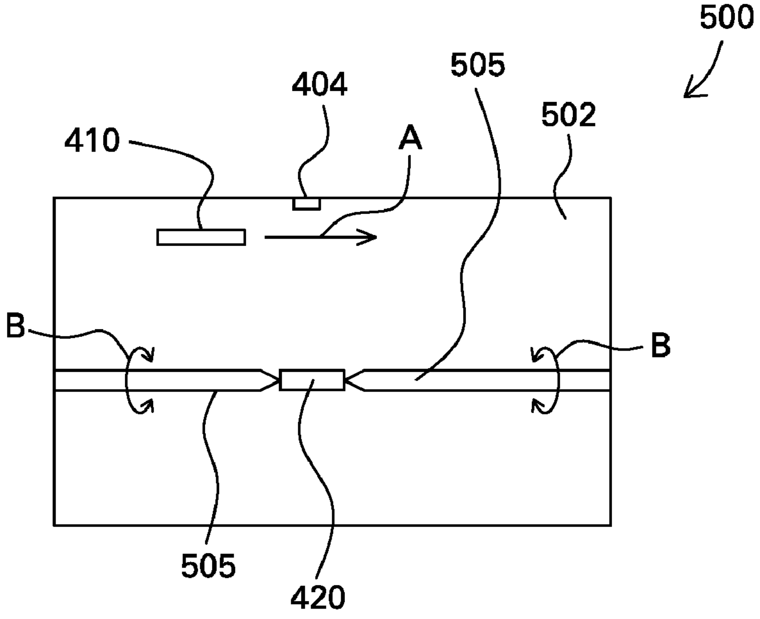
FIG. 14 is a schematic view of a deposition assembly constructed in accordance with an embodiment of the invention.

Referring to FIG. 14, there is shown a multilayer optic deposition assembly 500 that includes a deposition chamber 502 and the movable shutter 410. The deposition chamber 502 includes the apparatus 404 that is the source of a vapor stream and a pair of rotatable spindles 505. The spindles 505 are capable of rotating in a direction B. Further, the spindles 505 each include a pointed end that comes into contact with and holds the blank 420. By rotating the spindles 505 in the same direction B the blank 420 can be rotated while deposition material is introduced into the deposition chamber 502 through the inputting apparatus 404. Movement of the shutter apparatus 410 in the direction A and rotation of the blank 420 in the direction B will enable the formation of a multilayer optic such as the multilayer optic 10 shown in FIG. 5. Alternatively, the spindles 505 can remain in a non-rotating state during a first set of deposition steps to form the layers 113*mid* to 113*a*. Then, the spindles 505 can be rotated to turn the partially formed multilayer optic one hundred and eighty degrees around to allow for a second set of deposition steps to form the layers leading to and including 113*n* to form the multilayer optic 110.

Instead of utilizing a shutter apparatus 410, it is possible to move at varying speeds the inputting apparatus 404 relative to the blank 420 while the blank 420 is being rotated by the spindles 505. Further, it is possible to move at varying speeds the spindles 505 and the blank 420 within the deposition chamber 402 relative to the inputting apparatus 404.

Figure 15:
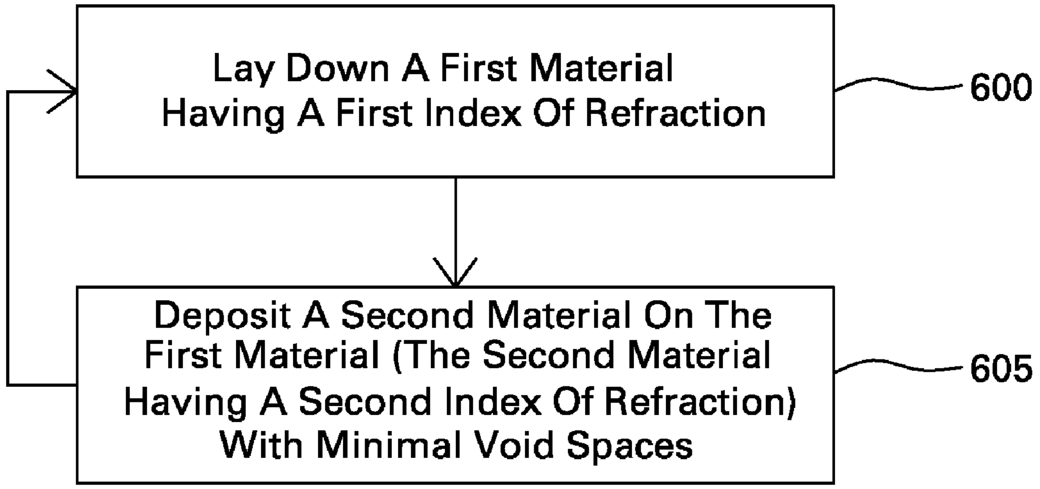
FIG. 15 illustrates process steps for fabricating an optic device in accordance with an embodiment of the invention.

FIG. 15 illustrates process steps for forming a multilayer optic in accordance with an embodiment of the invention. At Step 600, a first material having a pre-determined index of refraction with a pre-determined photon transmission coefficient is deposited. The first material is deposited on a blank or substrate, which may be a core, a cone, or a polygonal support mechanism. It should be appreciated that the blank or substrate may be incorporated within the multilayer optic, such as the core 50, or may serve merely as a mold, like cone 150. Then, at Step 605, a second material having a second index of refraction with a second photon transmission coefficient is deposited on the first material in such a way as to be conformal and have minimal void spaces. It should be appreciated that each individual layer may be formed at thicknesses in the range of one nanometer to thousands of nanometers. After Step 605, the Steps 600 and 605 can be sequentially repeated to prepare multiple pairs of layers, with each pair having one layer having a first index of refraction with a first photon transmission coefficient and a second layer having a second index of refraction with a second photon transmission coefficient. The deposition of the first and second materials may be accomplished by any number of suitable processes, such as, for example, vapor deposition, thermal spray deposition, or electroplating. As noted previously, examples of suitable vapor deposition techniques include sputtering, ion implantation, ion plating, laser deposition (using a laser beam to vaporize a material or materials to be deposited), evaporation, or jet vapor deposition (using sound waves to vaporize a material or materials to be deposited). Also as noted previously, evaporation techniques may be thermal, electron-beam or any other suitable technique that will result in appreciable deposition of material. Examples of suitable thermal spray deposition techniques include combustion, electric arc, and plasma spray.

It should be appreciated that during the deposition process, the partially formed multilayer optic may be rotated, oscillated, or moved, it may be turned, and it may be subjected to a deposition process whereby the deposition material is deposited at different rates along the axis of the multilayer optic. In this way, multilayer optics can be formed with various configurations and profiles that will allow for a greater amount of electromagnetic radiation to be collected from a source at the input of the optic, parallel or near parallel beams of electromagnetic radiation to be output from the multilayer optic, or the beams of electromagnetic radiation output from the multilayer optic may be shaped into pencil beams, cone beams, fan beams, or curved in an arc, as an example.

Multilayer optics in accordance with embodiments of the invention may be used in various industrial applications. For example, a multilayer optic formed to emit a quasi-parallel beam having a circular cross-section may find utility in X-ray diffraction and backscatter applications, such as non-destructive examination. A multilayer optic formed to emit a slightly focused beam with a circular cross-section may find utility in X-ray diffraction, X-ray fluorescence, medical diagnostic or interventional treatments, and non-destructive examination applications. Multilayer optics formed to emit a highly focused beam having a circular cross-section may find utility in X-ray fluorescence; medical diagnostic or interventional treatments of, for example, small tumors; and, non-destructive examination applications. Multilayer optics formed to emit a slightly diverging beam having a circular cross-section may find utility in computed tomography and X-ray diagnostic system applications. Multilayer optics formed to emit a highly diverging beam having a circular cross-section may find utility in non-destructive examination applications requiring an increased field-of-view, and in medical diagnostic or interventional imaging and treatments requiring an increased field-of-view, such as the imaging and treatment of large tumors.

One example of the utility of multilayer optics formed to emit a variety of beam shapes is in medical interventional treatments, such as treatment of tumors, where the optic shape is determined by the tumor shape. Such multilayer optics would allow X rays to be focused onto the tumor without irradiating nearby healthy tissue, providing targeted treatment with a minimum of damage to surrounding healthy tissue.

Figure 16:
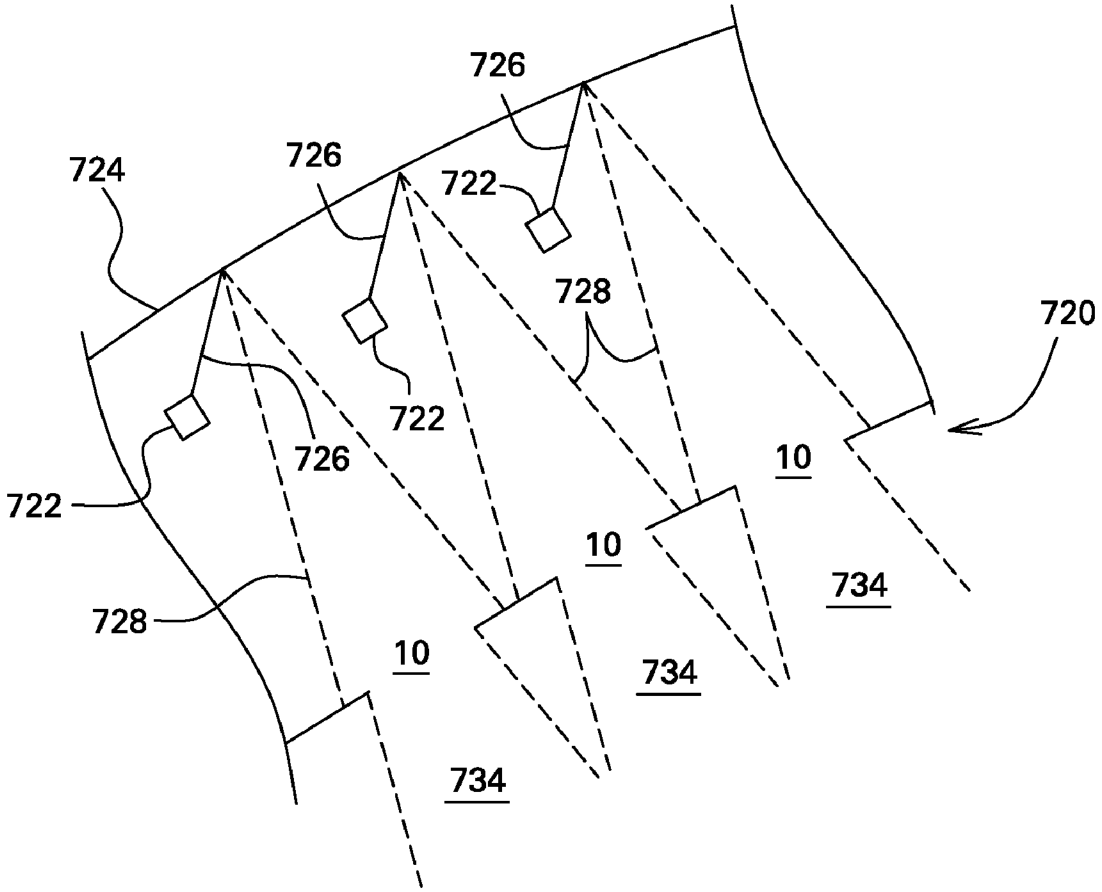
FIG. 16 is a diagrammatical representation of a distributed source for use with an imaging system.

FIG. 16 illustrates a portion of an exemplary distributed X-ray source of the type that may be employed in a variety of imaging systems, such as, for example, an X-ray imaging system, X-ray diagnostic system, or a CT system. As shown in FIG. 16, in an exemplary implementation, a distributed X-ray source 720 may include a series of electron beam emitters 722 that are coupled to a radiation source controller (not shown), and are triggered by the source controller during operation of the imaging system. The electron beam emitters 722 are positioned adjacent to a target 724. Upon triggering by the source controller, the electron beam emitters 722 may emit electron beams 726 toward target 724. The target 724, which may be, for example, a tungsten rail or element, emits X-ray radiation, as indicated at reference numeral 728, upon impact of the electron beams 726. In reflection mode, X-rays are meant to be produced primarily on the same side of the target as where the electrons impact. In transmission mode, X-rays are produced at the opposite side of the target. The X-ray beams 728 then are directed toward multilayer optics 10, one such optic for each X-ray beam. The optics 10 may be formed in such a way as to collect a significant portion of each X-ray beam from each X-ray generation spot on the target and form collimated or limited cone beams 734 that will be directed to the imaging volume of the imaging system, through the object of interest, and which will impact detector elements on an opposite side of the imaging system.

A number of alternative configurations for emitters or distributed sources may be, of course, envisioned. For example, it is envisioned that a plurality of electron sources, a plurality of transmission targets, and/or a plurality of reflection targets may be incorporated into a configuration that utilizes one or more optic devices, such as the optic devices 10. For example, a configuration that includes multiple electron sources with either a single reflection target or a single transmission target, a configuration that includes multiple electron sources with multiple transmission or reflection targets, and a configuration that includes a single electron source swept across a single target are envisioned as being coupled to one or more optic devices, such as the optic devices 10.

Moreover, the individual X-ray sources in the distributed source may emit various types and shapes of X-ray beams. These may include, for example, fan-shaped beams, cone-shaped beams, and beams of various cross-sectional geometries. Similarly, the various components comprising the distributed X-ray source may also vary. In one embodiment, for example, a cold cathode emitter is envisioned which will be housed in a vacuum housing. A stationary anode is then situated in the housing and spaced apart from the emitter. This type of arrangement generally corresponds to the diagrammatical illustration of FIG. 16. Other materials, configurations, and principals of operation may, of course, be employed for the distributed source. The emission devices may be one of many available electron emission devices, for example, thermionic emitters, carbon-based emitters, photo emitters, ferroelectric emitters, lasers, monolithic semiconductors, etc.

Figure 17:
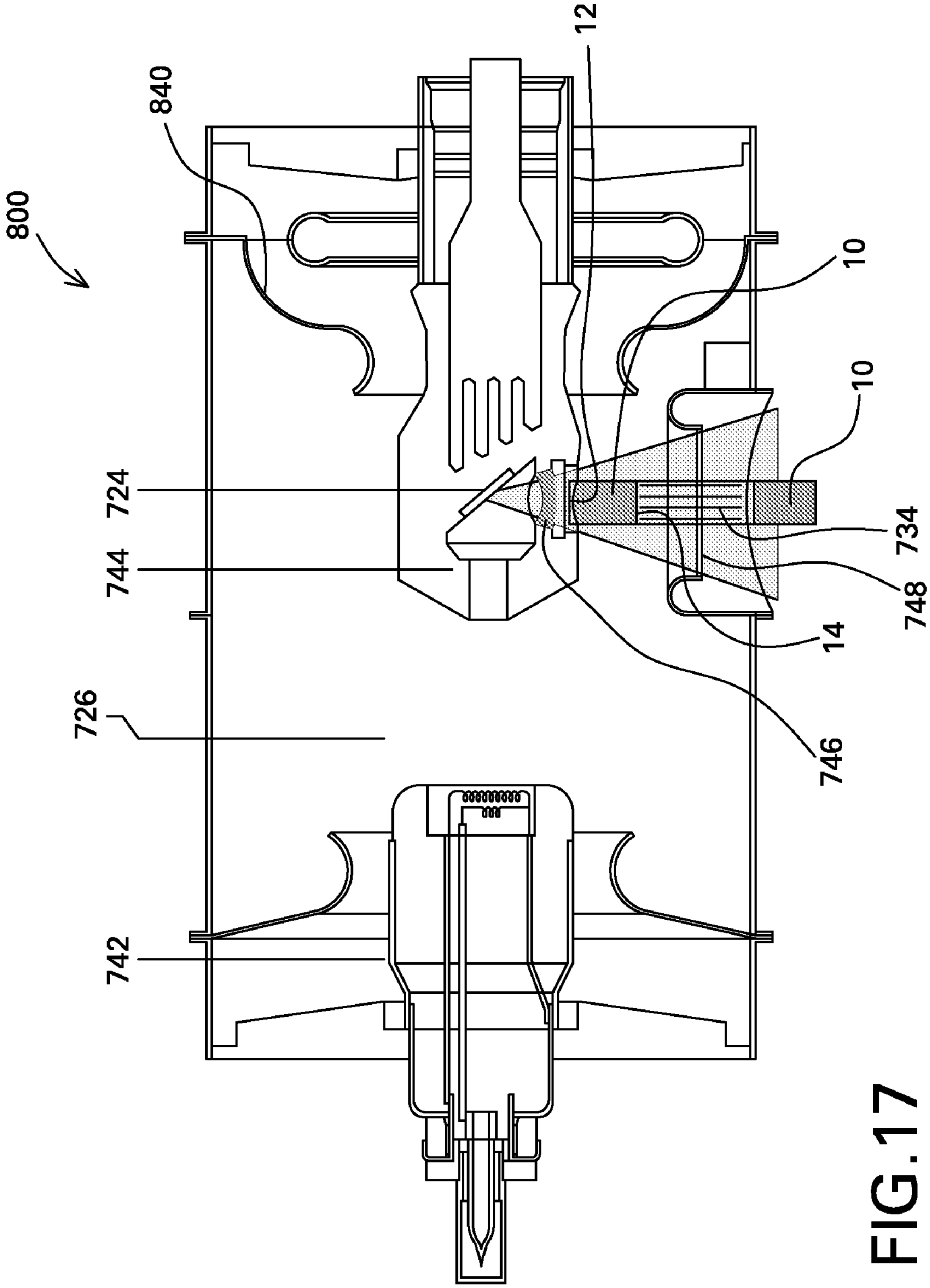
FIG. 17 is a cross-sectional view of an X-ray tube head using an optic in accordance with an embodiment of the invention.
Figure 18:
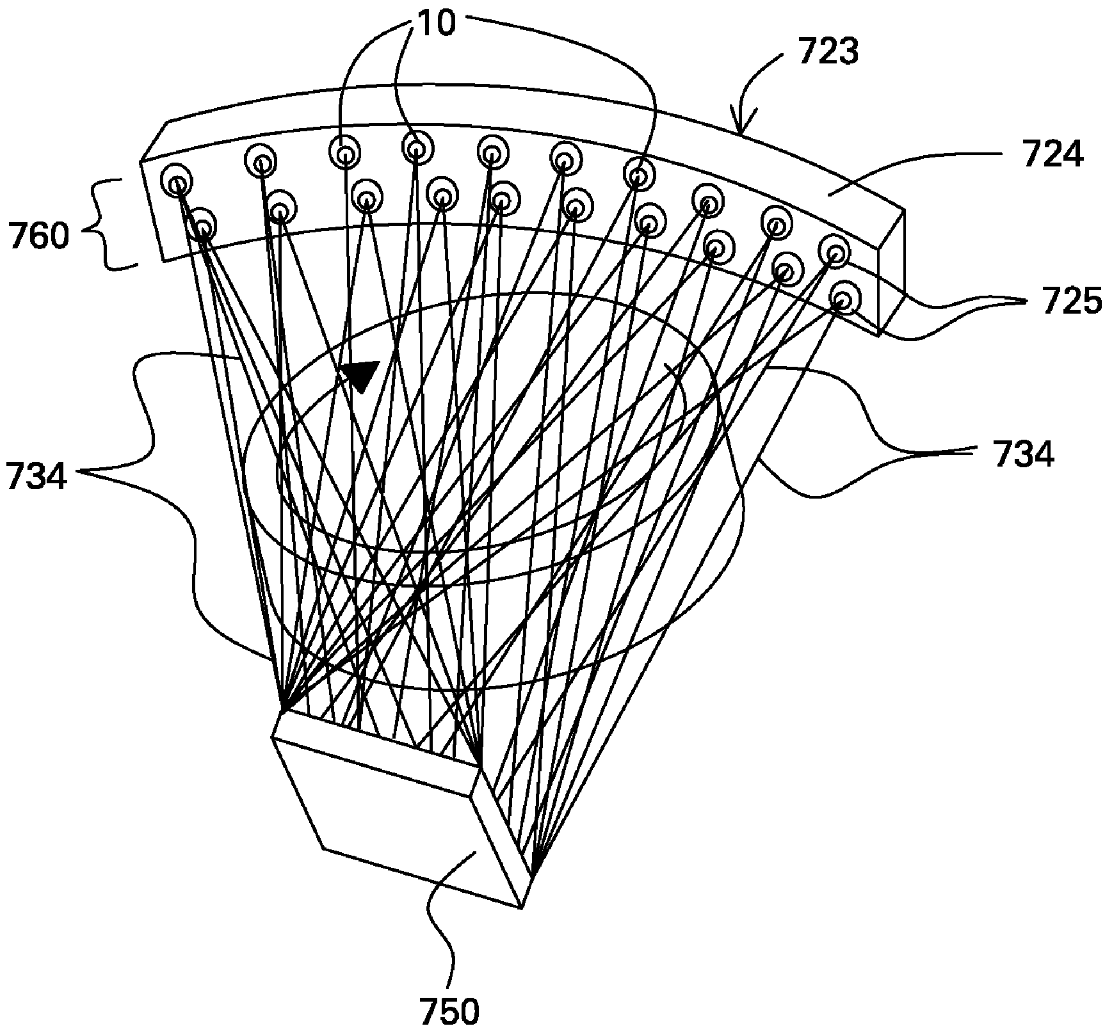
FIG. 18 is a schematic view of an array of multilayer optics, each being coupled between a target spot of a distributed X-ray source and a detector, in accordance with an embodiment of the invention.

FIG. 17 illustrates an acquisition subsystem 800 that includes an X-ray tube head 840. A filament, such as, for example, a tungsten filament within a cathode 742, is heated to emit an electron beam 726, which is directed towards an anode 744 in which resides the target 724. The target 724 emits a beam of X-rays which are collimated, as described previously, namely collimated beams 734, which pass through one or two windows 746, 748 that may include filtering toward a detector array 750 (FIG. 18). The collimated X-rays pass through a window 748 illuminating an object as they travel toward the detector array 750.

A multilayer optic, such as the multilayer optic 10 is incorporated within the system 800. The alternating lower and higher index of refraction materials in contiguous layers of a multilayer optic 10 utilize the principle of total internal reflection to collect a large solid angle of X-rays from the target 724 and redirect them into X-ray beams 734 exiting the output face 14 of the optic 10. The multilayer optic 10 can be formed to output any desired beam. The multilayer optic 10 can be positioned exterior or interior to the window 748. The multilayer optic 10 is shown in both locations in FIG. 17 for ease of illustration.

Figure 19:
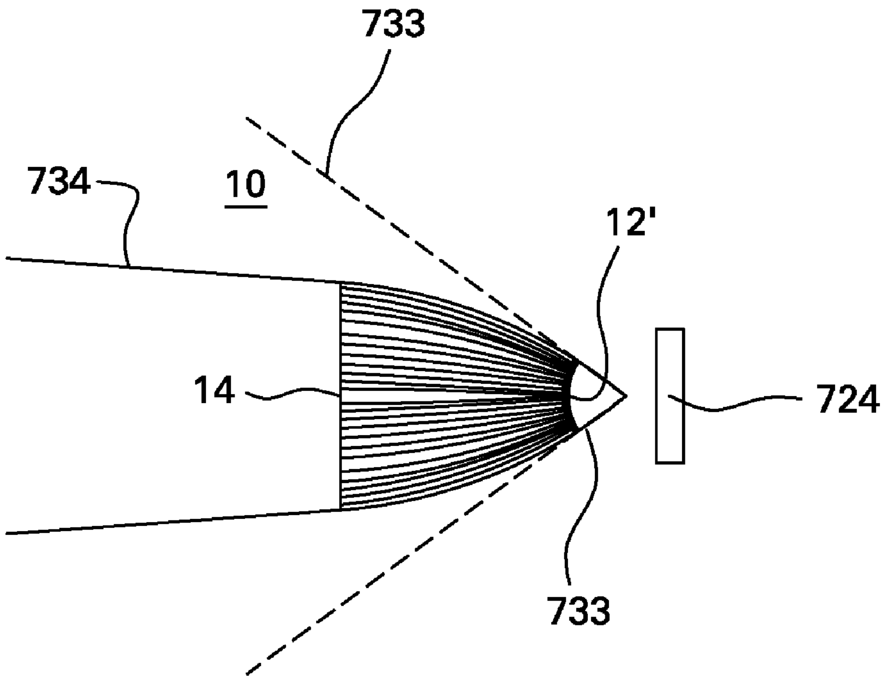
FIG. 19 is a schematic view of a multilayer optic formed to produce a limited cone beam in accordance with an embodiment of the invention.
Figure 20:
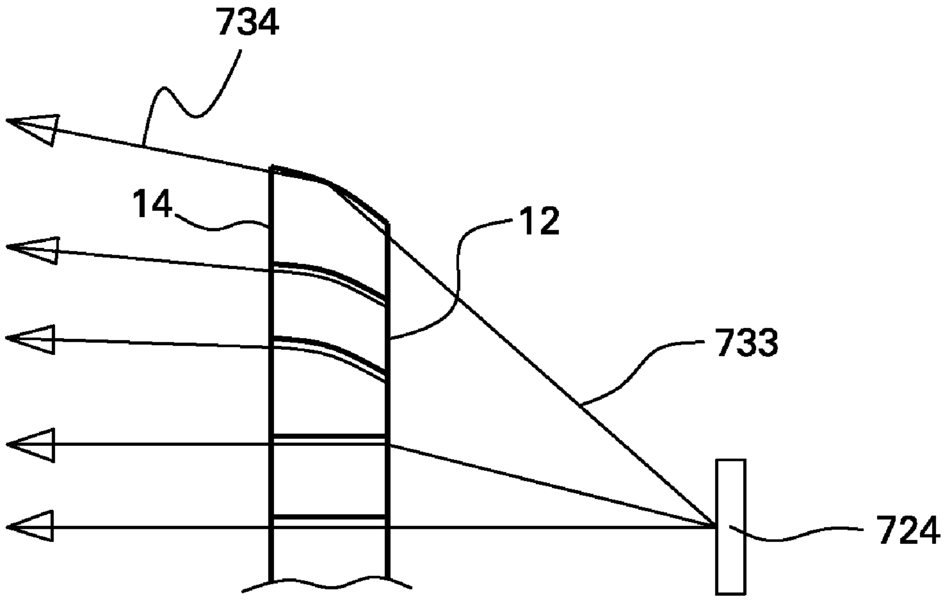
FIG. 20 is a partial cross-sectional view of the multilayer optic of FIG. 19.

The multilayer optic 10 may be formed in such a way as to produce a limited cone beam of X-rays, such as the beams of photons 734 shown in FIGS. 17, 19 and 20. The multilayer optic 10 for producing a limited cone beam of X-rays can be formed as described above with reference to FIGS. 2-5, with the exception being that the output face 14 is formed closer to an input face 12 or 12', i.e., positioned prior to the region where the photons are redirected into parallel rays. The input face 12' may be similar to the input face 12 described previously or it may be configured to be non-flat to accept as much of the source cone of X-rays 733 from the target 724. Examples of the non-flat input face 12' include a curved face and a multi-faceted face. The input face 12' may be curved or multi-faceted in one plane (illustrated in FIG. 19) or may be curved or multi-faceted in a plurality of planes, i.e., concave or convex relative to the target 724. A non-flat input face, such as input face 12', may be so configured to minimize the amount of X-rays reflected away from the input face, or in other words, to maximize the transmission of X-rays into the layers of the optic device 10 having a higher index of refraction. Alternatively, a non-flat input face may be so configured to accept X-ray beams from a variety of dispersed sources. Placement of the output face 14 within the X-ray redirection regions allows the input X-ray beams 733 to be shaped into a limited cone beam 734, remaining diverging but with a smaller divergence than the intrinsic source beam as they exit the output face 14.

It should be appreciated that multiple optic devices, such as the multilayer optics 10, may be used in conjunction with multiple focal spots or a single focal spot on a single target. By focal spots is meant the spot on the target where the electron beam hits the target and X-rays are generated. For example, and with specific reference to FIG. 18, there is shown a vacuum vessel 723 containing a target, such as target 724 of system 800 (FIG. 17), that includes an array 760 of multilayer optics 10. Each of the multilayer optics 10 is positioned in front of an X-ray beam 725 on the target 724. As illustrated, this array 760 of multilayer optics 10 utilizes a stacked relationship to collect most of an X-ray line source, which can include multiple focal spots forming a line, or a solid line focal spot, and create a set of parallel reduced cone beams that may be utilized for volumetric imaging.

Each of the multilayer optics 10 in the array 760 provides a means of utilizing a higher percentage of the available X-ray flux from each of the X-ray beams 725, and redirecting them into a stack (discrete or continuous) of parallel reduced cone beams 734. The result is a higher X-ray flux utilization than without the optic array 760. Although described in terms of multilayer optics 10, it should be appreciated that the array 760 may include a plurality of multilayer optics 110, 210, or 310.

There are a number of targeted field-of-view applications that utilize only a portion of a source X-ray cone. Examples include radiographic imaging, non-destructive testing, computed tomography, X-ray diffraction, and X-ray diagnostic systems. Such targeted field-of-view applications using a portion of the source X-ray cone benefit from the increased flux delivery provided by embodiments of the multilayer optics described herein. Further, in applications where the X-ray flux density is currently sufficient, an increased flux density from the multilayer optics would allow X-ray sources in such applications to operate at lower power. This leads to reduced target loading, which increases the reliability of the source and decreases the overall cost of the system.

There are a number of medical applications, such as 3D-conformal radiotherapy (3D-CRT) or intensity-modulated radiotherapy (IMRT), that would benefit greatly from the increased radiation flux produced by the multilayer optics. Additionally, many medical applications may benefit from the ability of the optic devices to focus the radiation into odd-shaped restricted volumes of space. The main goal in these types of radiotherapy treatments is to develop a technique that spares normal tissue while allowing dose escalation at the treatment site. The multilayer optic, with its ability to focus X rays and its flexibility in focusing these X rays into a wide variety of shaped beams, would permit tuning of the X-ray beam to the shape of the disease site and minimize radiation of surrounding healthy tissue. Similarly, in interventional radiotherapy where images are used to guide the positioning of the X-ray beam to the disease site, which then may or may not be treated with the radiation beam, the multilayer optic would be of great benefit by providing maximal radiation flux while minimizing the amount of irradiated healthy tissue.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, while embodiments have been described in terms that may initially connote singularity, such as, for example, a source of electrons or a target, it should be appreciated that multiple components may be utilized. Further, while the embodiments of the invention described with specific reference to FIGS. 17-20 refer to a multilayer optic 10, such description was for ease of description only and it should be appreciated that any of the multilayer optics described herein can be incorporated as appropriate. Further, although the multilayer optics have been described with reference to a CT imaging system, it should be appreciated that the multilayer optics may be incorporated into any imaging system, such as an X-ray diffraction system, or a medical diagnostic or intervention system. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. An imaging system for imaging an object, comprising:
- a source of electrons;
- a target for emitting X-rays upon being struck by electrons from said source of electrons, said target being enclosed within a housing;
- a window positioned within a wall of said housing; and
- an optic device positioned external to the housing and within a pathway of at least a portion of the X-rays, said optic device utilizing total internal reflection to redirect the X-rays at an energy level above about sixty keV.

2. The system of claim 1, wherein said optic device is configured to focus polychromatic radiation.

3. The system of claim 1, wherein said optic device comprises at least three conformal solid phase layers, wherein interfaces between said solid phase layers lack void areas and wherein said at least three conformal solid phase layers include at least two photon redirection regions.

4. The system of claim 3, wherein said at least three conformal solid phase layers comprise a first solid phase layer having a first index of refraction and a second solid phase layer having a second index of refraction different than said first index of refraction.

5. The system of claim 3, wherein said first and second solid layers include X-ray redirection regions formed to redirect the X-rays into a limited cone beam or a reduced cone beam.

6. The system of claim 3, wherein said optic device comprises an input face for receiving the X-rays and an output face through which beam exits said optic device.

7. The system of claim 6, wherein said input face is curved.

8. The system of claim 1, wherein said optic device is configured to focus highly monochromatic radiation.

9. The system of claim 1, wherein said optic device is configured to focus quasi-monochromatic radiation.

10. The system of claim 1, comprising a filter for transforming a polychromatic output of the optic device into a quasi-monochromatic beam.

11. The system of claim 1, wherein said optic device is positioned adjacent to said window.

12. The system of 1, wherein said optic device is positioned within said housing.

13. An imaging system for imaging an object, comprising:

a source of electrons;

a target for emitting X-rays upon being struck by electrons from said source of electrons;

a vacuum chamber for housing said target;

a window between said vacuum chamber and the object; and an optic device utilizing total internal reflection to redirect the X-rays, said optic device being positioned within said vacuum chamber.

14. An imaging system for imaging an object, comprising:

at least one source of electrons;

at least one target for emitting X-rays upon being struck by electrons from said at least one source of electrons; and an array of optic devices utilizing total internal reflection to redirect the X-rays, said array of optic devices being positioned between said at least one target and the object;

wherein either or both of said at least one source of electrons and said at least one target comprise, respectively, a plurality of sources of electrons and a plurality of targets.

15. A method for imaging an object, comprising:

placing an object between a source of X-rays and a detector; and directing the X-rays through an optic device configured to redirect photons by total internal reflection at an energy level above about sixty keV.

16. The method of claim 15, wherein said source of X-rays comprises a target housed within the vacuum chamber.

17. The method of claim 16, wherein the optic device is positioned within the vacuum chamber between the target and the object.

18. The method of claim 16, wherein the optic device is positioned adjacent to a window and exterior to the vacuum chamber.

19. An optic device for transmitting and redirecting X-rays by means of total internal reflection, comprising:

a non-flat input face;

an output face; and at least three conformal solid phase layers between said non-flat input and said output face, wherein interfaces between said solid phase layers are gapless and wherein said at least three conformal solid phase layers include at least two X-ray redirection regions.

20. The optic device of claim 19, wherein said at least three solid phase layers are comprised of two or more materials.

21. The optic device of claim 19, wherein said at least three solid phase layers comprise alternating indices of refraction.

22. The optic device of claim 19, wherein each said X-ray redirection region is formed to redirect the X-rays into a limited cone beam or a reduced cone beam.

23. The optic device of claim 19, wherein each said X-ray redirection region comprises a plurality of redirecting segments, each said redirecting segment having a constant curvature.

24. The optic device of claim 19, wherein a plurality of said solid phase layers comprise an X-ray redirection region, each said X-ray redirection region having a composite curvature.

25. The optic device of claim 19, configured to transmit X-rays with energies above 1 keV.

26. The optic device of claim 19, configured for use in radiographic imaging, non-destructive examination, computed tomography, X-ray diffraction, X-ray interventional systems, or X-ray diagnostic systems.

27. The optic device of claim 19, wherein the non-flat input face is curved.

28. The optic device of claim 19, wherein the non-flat input face is multi-faceted.

* * * * *